United States Patent
Bradley et al.

(10) Patent No.: US 12,170,641 B2
(45) Date of Patent: Dec. 17, 2024

(54) DETECTION AND NOTIFICATION OF ELECTRONIC INFLUENCE

(71) Applicant: AT&T Intellectual Property I, L.P., Atlanta, GA (US)

(72) Inventors: Nigel Bradley, Canton, GA (US); Eric Zavesky, Austin, TX (US); James Pratt, Round Rock, TX (US); Ari Craine, Marietta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/662,693

(22) Filed: May 10, 2022

(65) Prior Publication Data
US 2023/0370406 A1    Nov. 16, 2023

(51) Int. Cl.
*G06F 15/16*    (2006.01)
*H04L 51/212*    (2022.01)
*H04L 51/224*    (2022.01)

(52) U.S. Cl.
CPC .......... *H04L 51/212* (2022.05); *H04L 51/224* (2022.05)

(58) Field of Classification Search
CPC ............................ H04L 51/212; H04L 51/224
USPC ......................................................... 709/206
See application file for complete search history.

(56) References Cited

U.S. PATENT DOCUMENTS

| | | | | |
|---|---|---|---|---|
| 5,996,011 | A * | 11/1999 | Humes | H04L 63/102 726/13 |
| 7,546,334 | B2 * | 6/2009 | Redlich | G06F 21/6263 709/219 |
| 7,669,051 | B2 * | 2/2010 | Redlich | G06F 21/6254 713/166 |
| 7,860,852 | B2 * | 12/2010 | Brunner | G06F 16/951 707/706 |
| 7,873,635 | B2 * | 1/2011 | Wang | H04L 63/1416 707/735 |
| 7,979,369 | B2 * | 7/2011 | Grenier | G06F 16/9535 706/20 |
| 8,065,199 | B2 * | 11/2011 | Dumon | G06Q 30/02 705/26.7 |
| 8,082,288 | B1 * | 12/2011 | Yeh | G06F 16/951 709/200 |

(Continued)

*Primary Examiner* — Alicia Baturay
(74) *Attorney, Agent, or Firm* — Guntin & Gust, PLC; Douglas Schnabel

(57) ABSTRACT

The disclosed technology is generally directed towards monitoring electronic communications to detect content in a communication that is attempting to influence the recipient user in some way. A user can specify influential intent preference data, such as which electronic communications services/applications to monitor for such influential intent content, and the types of the influential intent to monitor for, e.g., political influence types, advertisement influence types, and so on. A user also can specify remedial or other actions to take upon detection, e.g., block such content, alert on detecting such content and so on. An electronic influence manager server and/or application program can perform the monitoring and/or take the actions. Also described is reporting on the communications with influential intent, user actions with respect thereto. Reputation data can also be collected and used with respect to sources of communications with influential intent.

20 Claims, 13 Drawing Sheets

(56) References Cited

U.S. PATENT DOCUMENTS

| | | | | |
|---|---|---|---|---|
| 8,086,491 B1* | 12/2011 | Matz | G06Q 30/0269 | 705/14.66 |
| 8,176,563 B2 | 5/2012 | Redlich | G06F 21/6209 | 715/255 |
| 8,280,871 B2* | 10/2012 | Parikh | G06F 16/9535 | 707/708 |
| 8,301,728 B2* | 10/2012 | Kumar | G06F 16/951 | 709/219 |
| 8,335,833 B1* | 12/2012 | Parkinson | H04N 21/4882 | 715/752 |
| 8,695,100 B1* | 4/2014 | Cosoi | H04L 63/0227 | 726/22 |
| 8,819,804 B1* | 8/2014 | Sankruthi | G06F 21/50 | 709/224 |
| 8,831,953 B2* | 9/2014 | Vanjani | H04N 21/8106 | 704/9 |
| 8,869,046 B2* | 10/2014 | Brown | G06Q 30/02 | 705/26.7 |
| 8,959,093 B1* | 2/2015 | Nerurkar | G06F 16/9535 | 707/726 |
| 9,003,440 B2* | 4/2015 | Sinha | H04N 21/4784 | 725/19 |
| 9,053,493 B2 | 6/2015 | Rabii | G06Q 30/0241 | |
| 9,176,957 B2* | 11/2015 | Myslinski | G06F 16/43 | |
| 9,292,868 B2 | 3/2016 | Sundaresan | G06Q 30/06 | |
| 9,300,755 B2 | 3/2016 | Gerke | G06Q 10/10 | |
| 9,311,499 B2 | 4/2016 | Redlich | G06F 21/6209 | |
| 9,485,206 B2 | 11/2016 | Day, II | H04L 67/535 | |
| 9,531,751 B2* | 12/2016 | Chen | H04L 63/1483 | |
| 9,537,814 B2* | 1/2017 | Rubinstein | G06Q 50/01 | |
| 9,558,287 B2* | 1/2017 | Sherman | G06F 16/955 | |
| 9,600,582 B2 | 3/2017 | Zacher | G06F 21/554 | |
| 9,674,135 B2 | 6/2017 | Archibong | G06Q 30/0277 | |
| 9,674,579 B1* | 6/2017 | Jaini | H04N 21/4668 | |
| 9,690,856 B2 | 6/2017 | Stroganov | G06Q 10/00 | |
| 9,967,628 B2 | 5/2018 | Jaini | H04N 21/4532 | |
| 9,972,055 B2 | 5/2018 | Myslinski | G06F 40/205 | |
| 9,985,978 B2 | 5/2018 | Smith | G06F 21/565 | |
| 10,229,219 B2* | 3/2019 | Owens | G06F 16/9535 | |
| 10,237,226 B2 | 3/2019 | Ganci, Jr. | H04L 51/212 | |
| 10,237,280 B2* | 3/2019 | Day, II | H04L 63/102 | |
| 10,530,714 B2 | 1/2020 | Ioannou | H04L 67/10 | |
| 10,638,298 B1 | 4/2020 | Di Domenico | G06N 20/00 | |
| 10,659,851 B2 | 5/2020 | Lister | H04N 21/6587 | |
| 10,747,837 B2 | 8/2020 | Goldenstein | G06F 16/248 | |
| 10,827,023 B1 | 11/2020 | Yan | H04L 67/535 | |
| 10,853,572 B2 | 12/2020 | Viswanathan | G06F 40/284 | |
| 10,873,556 B2 | 12/2020 | Jorgenson | H04L 51/52 | |
| 10,972,411 B2 | 4/2021 | Ioannou | H04L 67/10 | |
| 11,153,403 B1* | 10/2021 | Yan | H04L 51/212 | |
| 11,206,270 B2* | 12/2021 | Onyekwelu | G06F 21/32 | |
| 11,250,045 B2* | 2/2022 | Vaughn | H04N 21/23418 | |
| 11,412,057 B1* | 8/2022 | Yan | H04L 51/212 | |
| 11,507,609 B1* | 11/2022 | Warmsley | G06F 16/335 | |
| 11,533,278 B2* | 12/2022 | Ioannou | H04L 67/10 | |
| 11,544,565 B2* | 1/2023 | Lyske | G06F 16/639 | |
| 2006/0075052 A1* | 4/2006 | Oostendorp | H04L 51/212 | 709/206 |
| 2008/0134282 A1* | 6/2008 | Fridman | G06Q 10/10 | 726/1 |
| 2009/0327849 A1* | 12/2009 | Kavanagh | G06Q 10/107 | 715/205 |
| 2011/0219084 A1* | 9/2011 | Borra | G06Q 10/10 | 726/4 |
| 2011/0231893 A1* | 9/2011 | Tovar | G06F 21/62 | 726/1 |
| 2011/0238465 A1* | 9/2011 | Shapiro Willet | G06Q 30/0227 | 705/41 |
| 2012/0131013 A1* | 5/2012 | Hobbs | G06F 16/27 | 707/748 |
| 2013/0018965 A1* | 1/2013 | Ramachandran | G06Q 50/01 | 709/206 |
| 2013/0041901 A1* | 2/2013 | Nikankin | G06F 16/958 | 707/754 |
| 2013/0124192 A1* | 5/2013 | Lindmark | G06F 40/253 | 704/E11.001 |
| 2013/0198213 A1* | 8/2013 | Ikeda | G06F 16/447 | 707/758 |
| 2013/0232263 A1* | 9/2013 | Kelly | G06Q 30/02 | 709/224 |
| 2014/0172622 A1* | 6/2014 | Baronshin | G06F 3/0482 | 705/26.7 |
| 2014/0280571 A1* | 9/2014 | Tarbox | H04N 21/43072 | 709/204 |
| 2015/0156227 A1* | 6/2015 | McCall | H04L 65/60 | 709/204 |
| 2015/0156236 A1* | 6/2015 | McCall | H04L 67/10 | 709/204 |
| 2015/0271546 A1* | 9/2015 | Kim | H04N 21/4788 | 725/109 |
| 2016/0014477 A1* | 1/2016 | Siders | H04N 21/4147 | 725/32 |
| 2016/0162576 A1* | 6/2016 | Ariño de la Rubia | G06F 21/602 | 707/739 |
| 2017/0295389 A1* | 10/2017 | Crist | H04N 21/4583 | |
| 2018/0276549 A1* | 9/2018 | Vo | G06Q 30/0241 | |
| 2019/0347287 A1* | 11/2019 | Crossno | G06N 20/00 | |
| 2020/0145389 A1* | 5/2020 | Shawe-Taylor | H04L 63/062 | |
| 2020/0273076 A1* | 8/2020 | Daga | H04L 51/046 | |
| 2020/0314152 A1* | 10/2020 | Andre | H04L 67/131 | |
| 2022/0224954 A1* | 7/2022 | Calkins | H04N 21/4882 | |
| 2022/0329556 A1* | 10/2022 | Daga | H04L 51/23 | |

* cited by examiner

DETECTION AND NOTIFICATION OF ELECTRONIC INFLUENCE

TECHNICAL FIELD

The subject application relates to electronic communications in general, and more particularly to detecting influential content in electronic communications, and related embodiments.

BACKGROUND

Contemporary users of media often receive electronic communications containing content that is intended to affect an influential behavior upon the users. A user often may not even recognize the attempted influence in such content. Other times the user recognizes the attempted influence, but does not want to be annoyed with having to deal with such content.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 5 is an example representation of an interface for selecting among available media content to monitor, in accordance with various aspects and embodiments of the subject disclosure.

DETAILED DESCRIPTION

Figure 1:
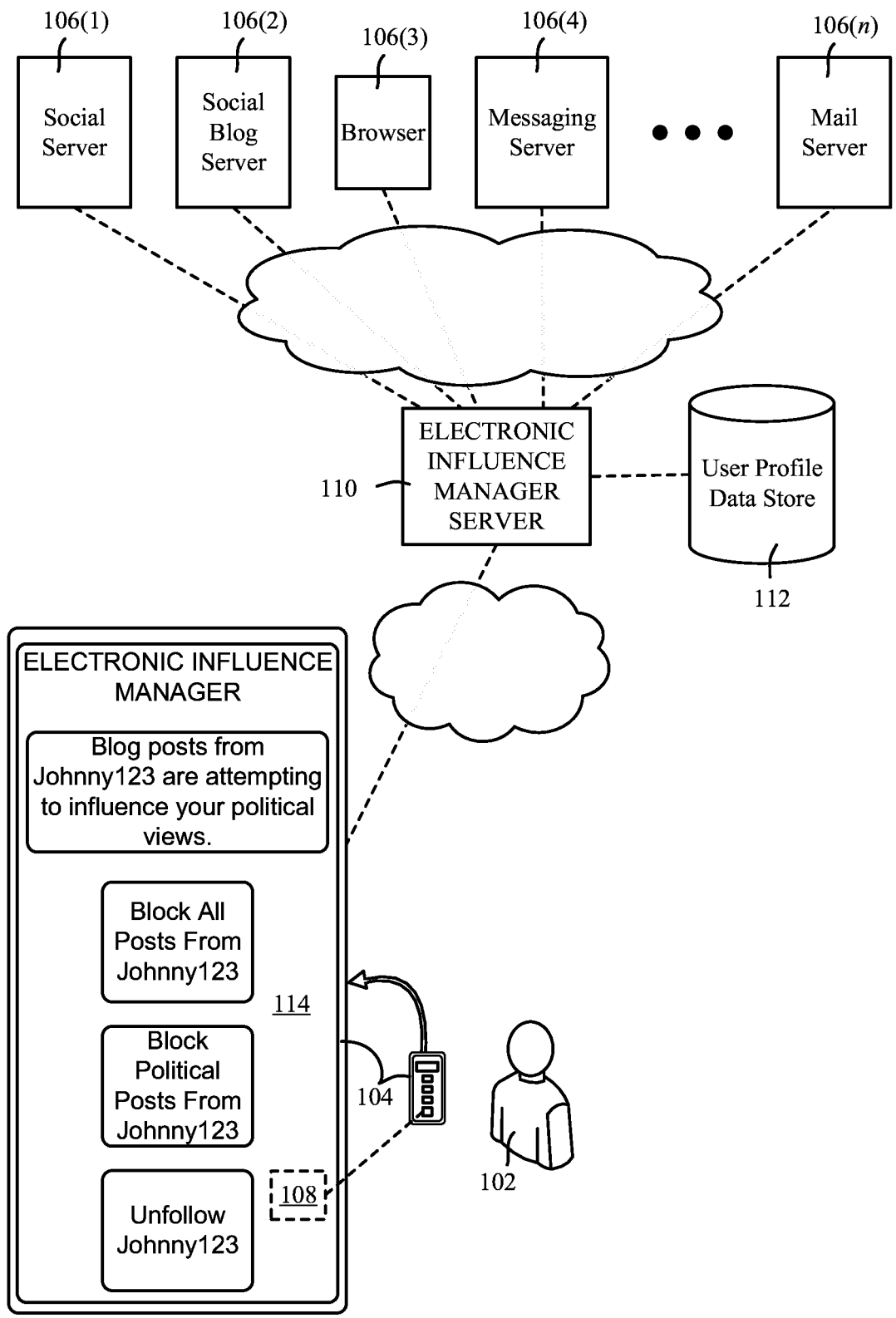
FIG. 1 is a block diagram of an example system for detecting influential content in electronic communications, in accordance with various aspects and embodiments of the subject disclosure.

The technology described herein is generally directed towards detecting of electronic communications directed to a user that attempt to influence the user's opinions or actions. The detection can result in some remediation action, including for the user to be notified of such communications, whether on a per-communication basis, and/or in the aggregate for a group of such communications. The technology described herein may exist across a number of electronic communication applications and the user may be alerted of individual attempts and/or overall trends. The technology described herein may be used with multiple different sources of electronic communications.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows a user 102 equipped with a communication device 104 (depicted in small and enlarged representations). The device 104 may run one or more communication application programs (apps) that are in communication with one or more corresponding application servers, e.g., 106(1)-106(n), which send out electronic communications. As is understood, the depicted servers 106(1)-106(n) are only examples, and there can be many more such applications and corresponding types of servers for a given user, including different types of servers for the same general purpose (e.g., multiple social media companies), and there can be fewer such applications and corresponding types of servers for a different given user.

The communication device 104 contains an electronic influence manager 108 (e.g., an application program, service, operating system component, firmware logic or the like) that may be in communication with an influence manager server 110 (e.g., of a service comprising multiple servers) coupled to a user profile data store 112. As described herein, the electronic influence manager 108 can work in conjunction with the influence manager server 110 to detect content in electronic communications that contains influential intent (to at least some reasonable likelihood). In the example of FIG. 1, any electronic communication that may contain influential content is first analyzed at the influence manager server 110.

As generally represented in FIGS. 1-8, the electronic influence manager 108 outputs various interactive user interfaces (e.g., 114 in FIG. 1). Example interfaces are by which the user can control, manage and/or otherwise take actions (e.g., review trends) with respect to content that contains influential intent are depicted herein; these are non-limiting examples.

Figure 2:
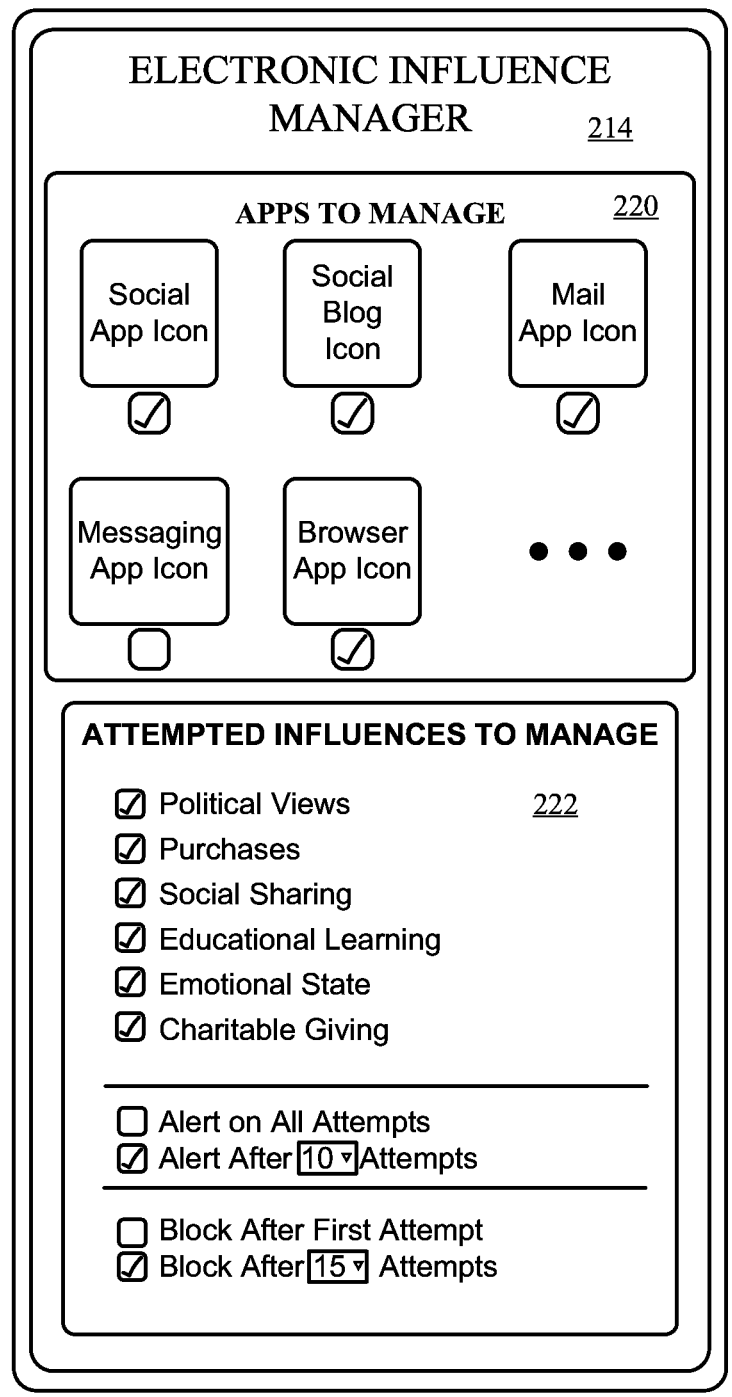
FIG. 2 is a representation of an example user interface by which a user can manage the detection of influential content via preference settings, in accordance with various aspects and embodiments of the subject disclosure.

By way of example, FIG. 2 shows an example user interface 214 by which a user may specify preference settings for how he or she wants the electronic influence manager 108 to operate. The settings may be saved as user profile data on the user's device 104 and also in the user profile data store 112 (e.g., a network database). The preference settings may selectively indicate which apps the user wishes the electronic influence manager 104 to monitor. For example in FIG. 2 the user has chosen (as represented by the checkmarks below the icons in the "APPS TO MANAGE" area 220) monitoring for a social app, a social blog app, a mail app, and a browser app (as well as possibly others). The user has not chosen monitoring of the user's messaging app (as well as possibly others).

Further, (as represented by the check-marked boxes/or non-checked boxes) in the "ATTEMPTED INFLUENCES TO MANAGE" area 222), the settings may specify what types of influence attempts the user wishes to have managed. These types of influence attempts may include some or all of the examples shown (Political Views, Purchases, Social Sharing, Educational Learning, Emotional State (e.g., intended to change mood), Charitable Giving) and possibly others. This allows indicating which types of influential communications that the user wishes to have managed and/or be notified about.

As also shown in the area 222, the user may further specify notification (alert) preference data and blocking data. In this example, the user has chosen to be alerted after an alerting threshold number (e.g., ten) attempts is met (an internal alert counter can be kept by the electronic influence manager 108 and/or server 110), rather than alerting on all attempts. The user also has chosen to block communications after a blocking threshold number (e.g., fifteen) attempts is met, rather than blocking on all attempts, such that future attempts that are detected after fifteen are blocked. Note that while not explicitly shown in FIG. 2, a timeframe for each threshold can be set, so that, for example, the first ten alerting threshold counter resets and thus starts over every month, while the first fifteen blocking threshold counter resets and starts over every week, and so on.

Returning to FIG. 1, when targeted influential communications are received at the electronic influence manager server 110 from communication with the one or more app servers 106(1)-106(n) via a network interface or the like. The user may provide permission (as stored in his or her user profile) for the electronic influence manager server 110 to communicate with the user's accounts on the one or more app servers 106(1)-106(n). In this manner, the electronic influence manager server 110 may monitor and analyze communications that are targeted for the user before they are delivered to the user's device. This monitoring is performed based on the user preference settings, as described herein.

By way of example, the settings may indicate that the user wishes to monitor Social Server 106(1) for any posts from other users that the user follows with respect to any posts that are determined to be attempting to influence the user's political views. The electronic influence manager server 110 may use the network interface to the Social Server 106(1) to retrieve and analyze the posts that are targeted for delivery to the user. The analysis may be an analysis of the text, video, images, or other data contained in the post to detect and infer the intent of the post and conclude any attempts to influence the user in any of the ways that they have indicated in their settings. This analysis may be accomplished using any of a number of known contextual analysis techniques for text, image, and video content, as well as considering other user feedback relative to the content item.

Figure 3:
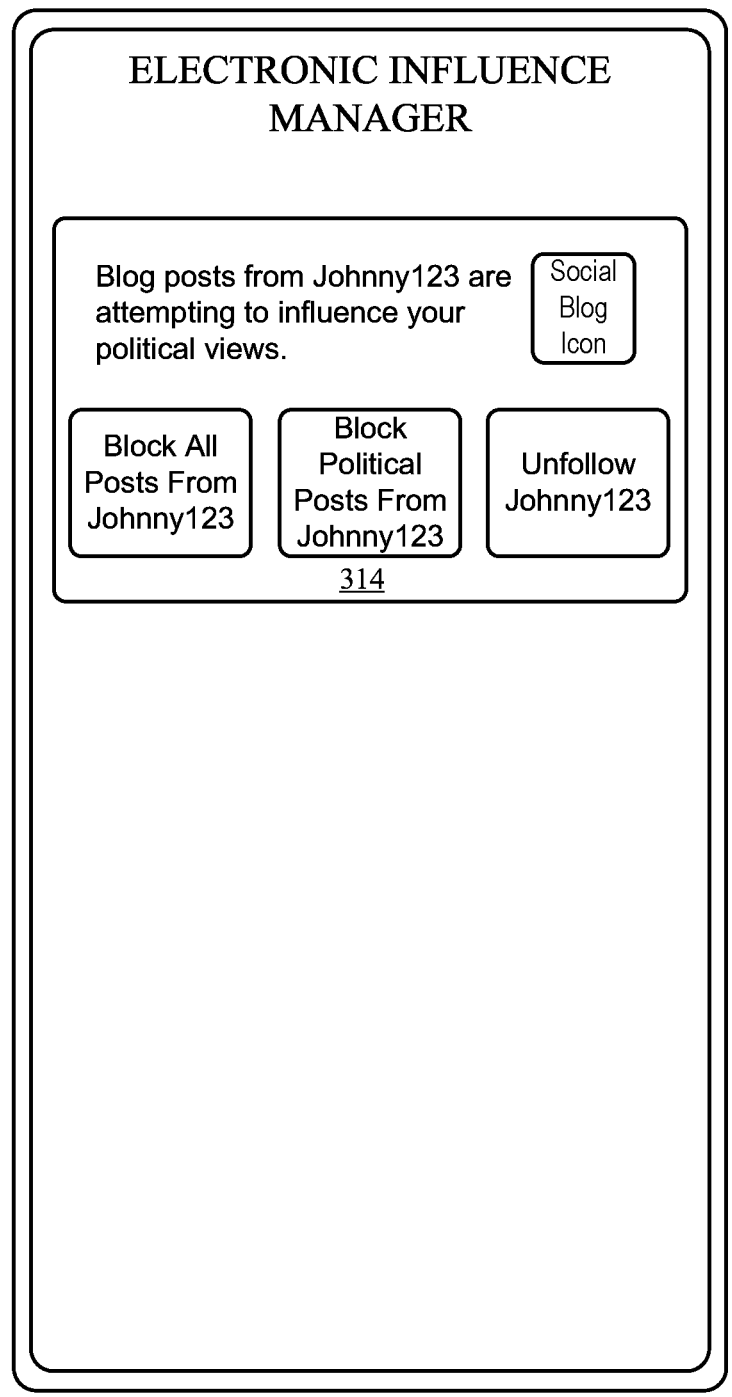
FIG. 3 is a representation of an example user interface by which a user is notified of targeted influential communications, in accordance with various aspects and embodiments of the subject disclosure.
Figure 4:
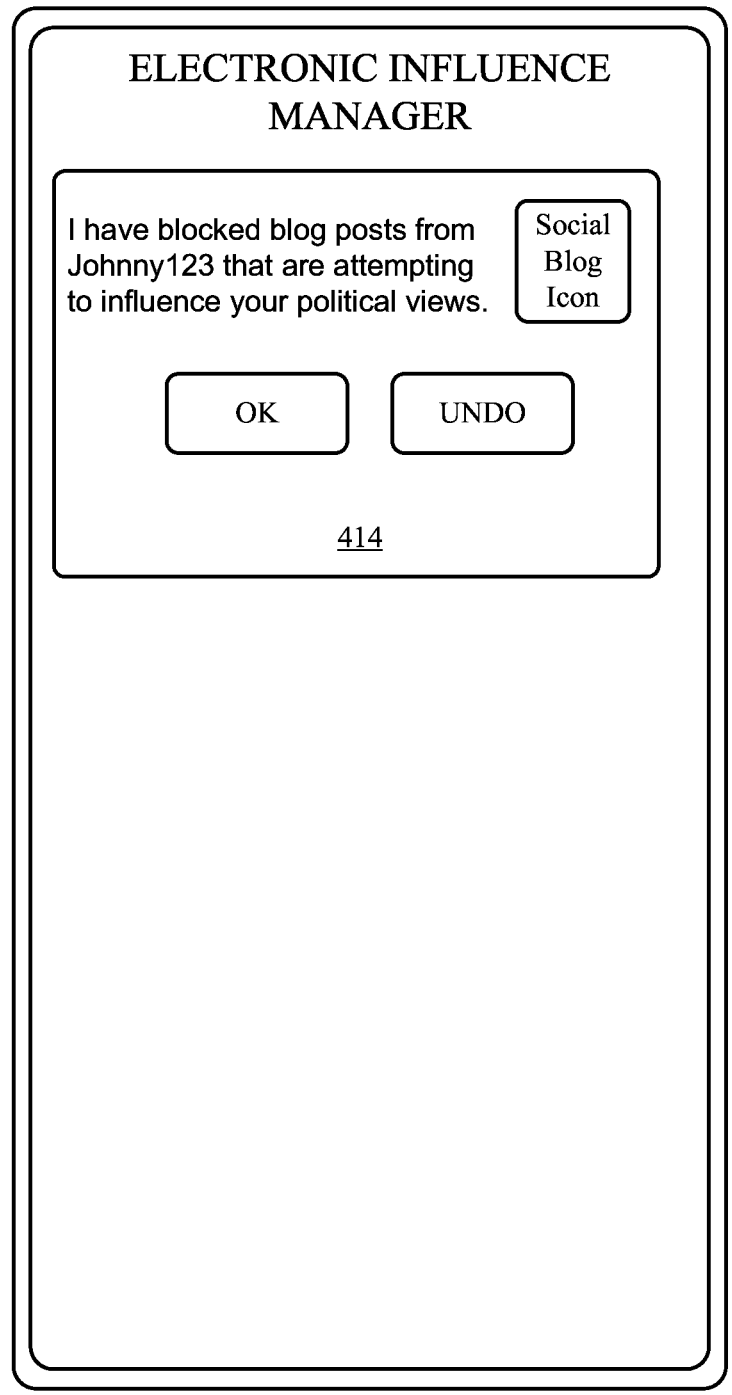
FIG. 4 is a representation of an example user interface by which a user is notified of a received influential communication having been blocked, in accordance with various aspects and embodiments of the subject disclosure.

As is understood, the same or similar process may be used for other apps and servers, such as to analyze emails, messages, advertisements, and other types of content targeted for the user. By analyzing targeted communications in this manner, the electronic influence manager server 110 may alert and/or block unwanted influence attempts before they are delivered to the user's device, while permitting other communications to pass through. As shown in FIG. 3, the user may be prompted (block 314) to respond to an alert. In another alternative, the server may block attempts in the background without requiring user interaction, or even without notifying the user. As is understood, user-specified preference settings can determine prompting, automatic blocking, including with or without any notification, and so on, which can be set on a per-app and/or per-influence type basis.

In another embodiment, the electronic influence manager 108 on the user's device may perform the analysis (including after analysis, if any, performed by the server 110). In this case, the analysis is of communications that are received by the appropriate app on the user's device by permitting an interface between the electronic influence manager 108 and the one or more apps on the device. The electronic influence manager 108 may analyze communications in the one or more apps and block or delete them on the apps so that they are not presented to the user. Alternatively, the electronic influence manager 108 may inform the user of its action, as depicted via the example interactive prompt 414 of FIG. 4.

The detection can be with respect to consumed influential communications. For example, the electronic influence manager 108 may use its interface to the one or more apps to not only analyze the content of each communication, but also enable in-app alerts to the user of detected influence attempts. In this case, a resulting action on the part of the user may result in a blocking action to be taken by the app itself.

Figure 5:
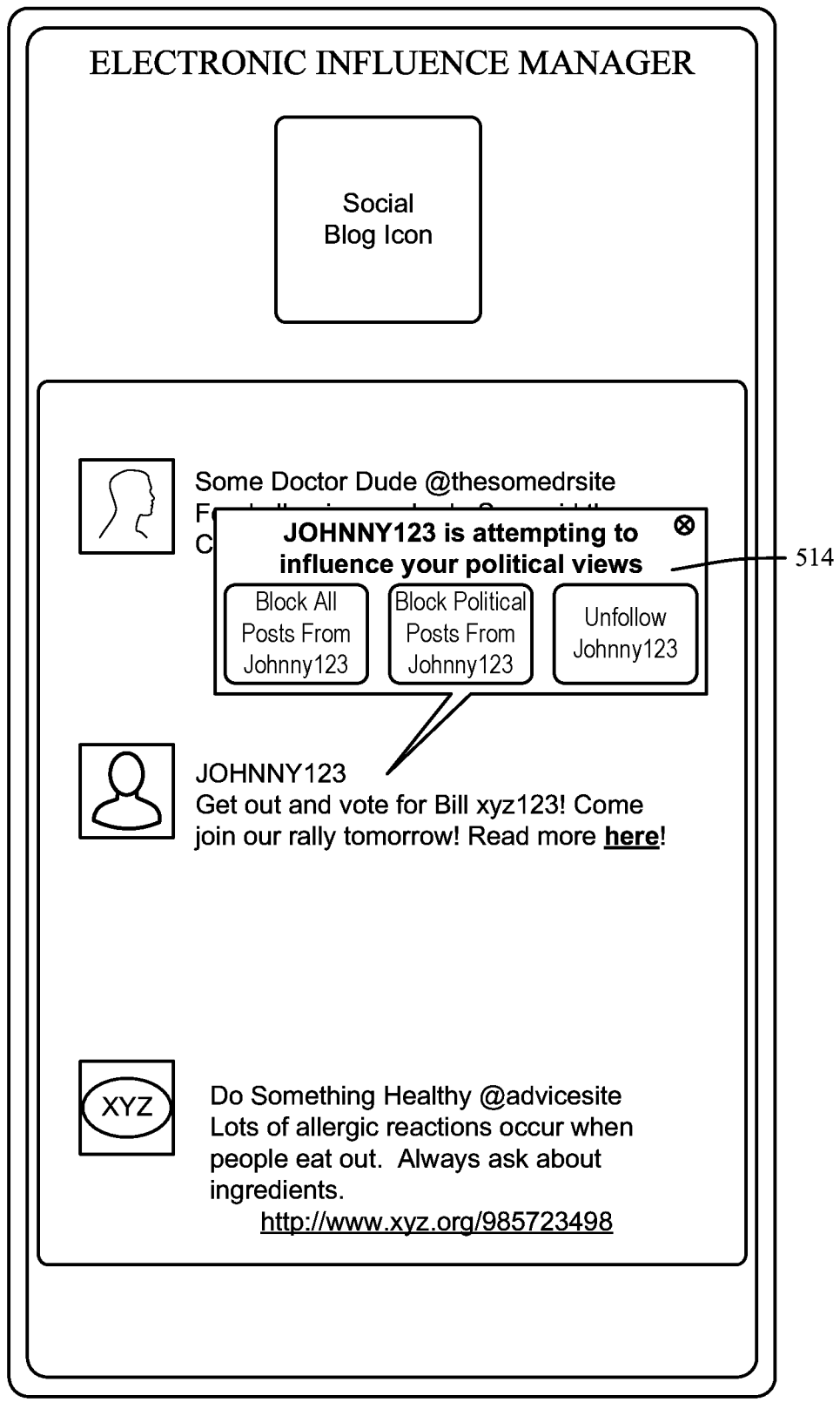
FIG. 5 is a representation of an example user interface by which a user is alerted of a consumed influential communication within a set of communications, in accordance with various aspects and embodiments of the subject disclosure.

FIG. 5 shows an example of an alert with respect to a social blog post that has been deemed an attempt to influence the user's political views. Although shown as an alert 514 overlaid proximate the consumable content, various other ways to highlight such content can be implemented instead of or in addition to such an alert. For example, content can be color highlighted, flashed, animated and so forth to indicate that it is being flagged in some way.

Although not explicitly shown among the interactive options (block all, block political or unfollow), another option is to return feedback in some way to the electronic influence manager 108 and/or the electronic influence manager server 110. The feedback may be as simple as "report this content" or may include substantive comments to send back. Such feedback can be used by the server 110, for example, to help in the future influence analysis/determination of similar or identical content.

Figure 6:
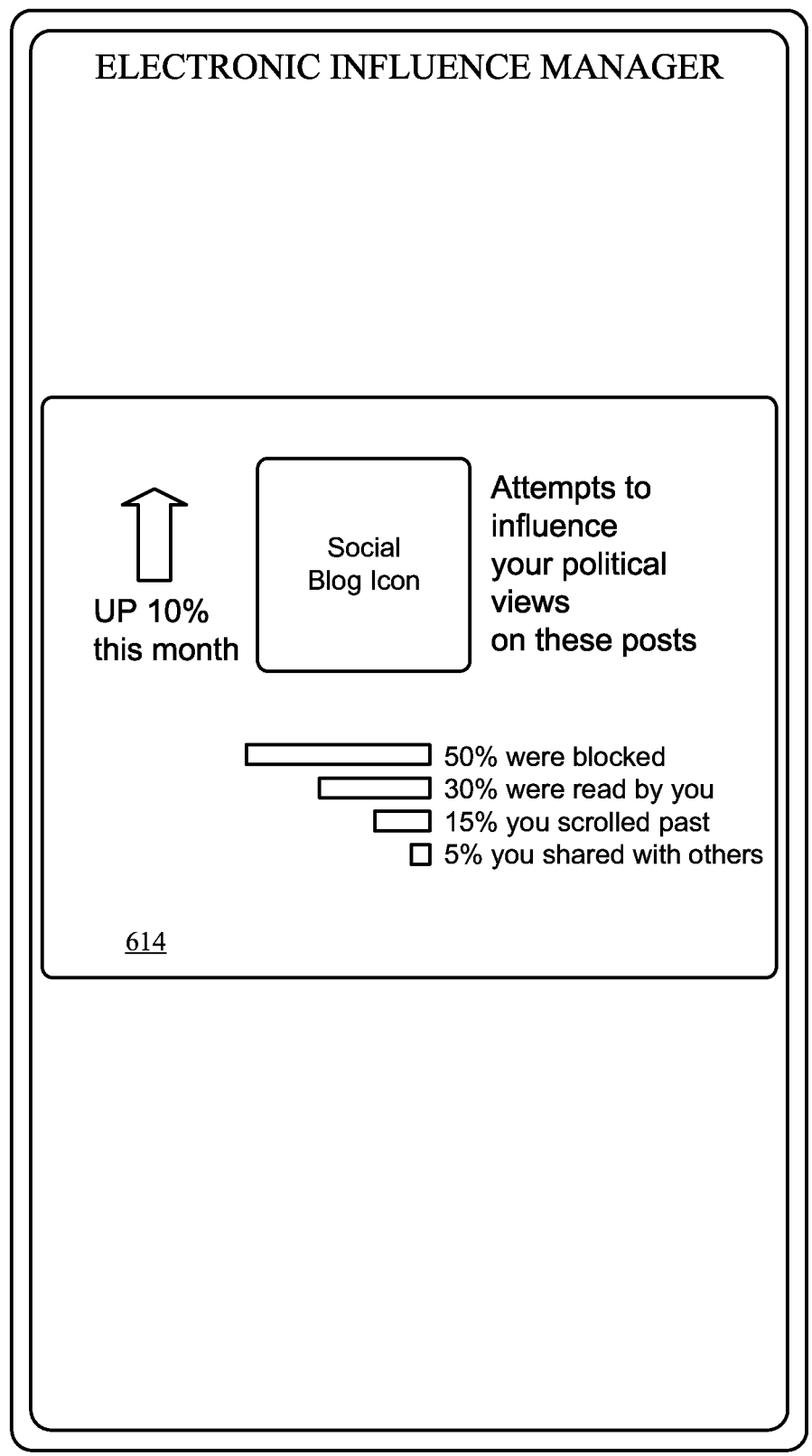
FIG. 6 is an example representation of an interface for reporting a user's tracked level of interaction with influence attempts in electronic communications, in accordance with various aspects and embodiments of the subject disclosure.

In another embodiment, the electronic influence manager 108 may be configured to track and report the user's level of interaction with influence attempts. For example, the electronic influence manager 108 may monitor influence attempts and whether the user reads them (based on them being displayed for a threshold duration of time) and otherwise interacts with them based on their actions on the app (e.g., the content is copied, scrolled through to read more and/or the like). These interactions may be tracked over a period of time and reported to the user. For example, FIG. 6 shows an example interface 614 that shows, for a given social blog server/app posts, shows monthly report data collected for the posts and the user's interaction therewith. Blocking data can include blocking by the electronic influence manager 108, the electronic influence manager server 110, or a combination of both. Thus, although not necessarily seen by the user, the user can still obtain a notification regarding a group of blocked electronic communications.

Figure 7:
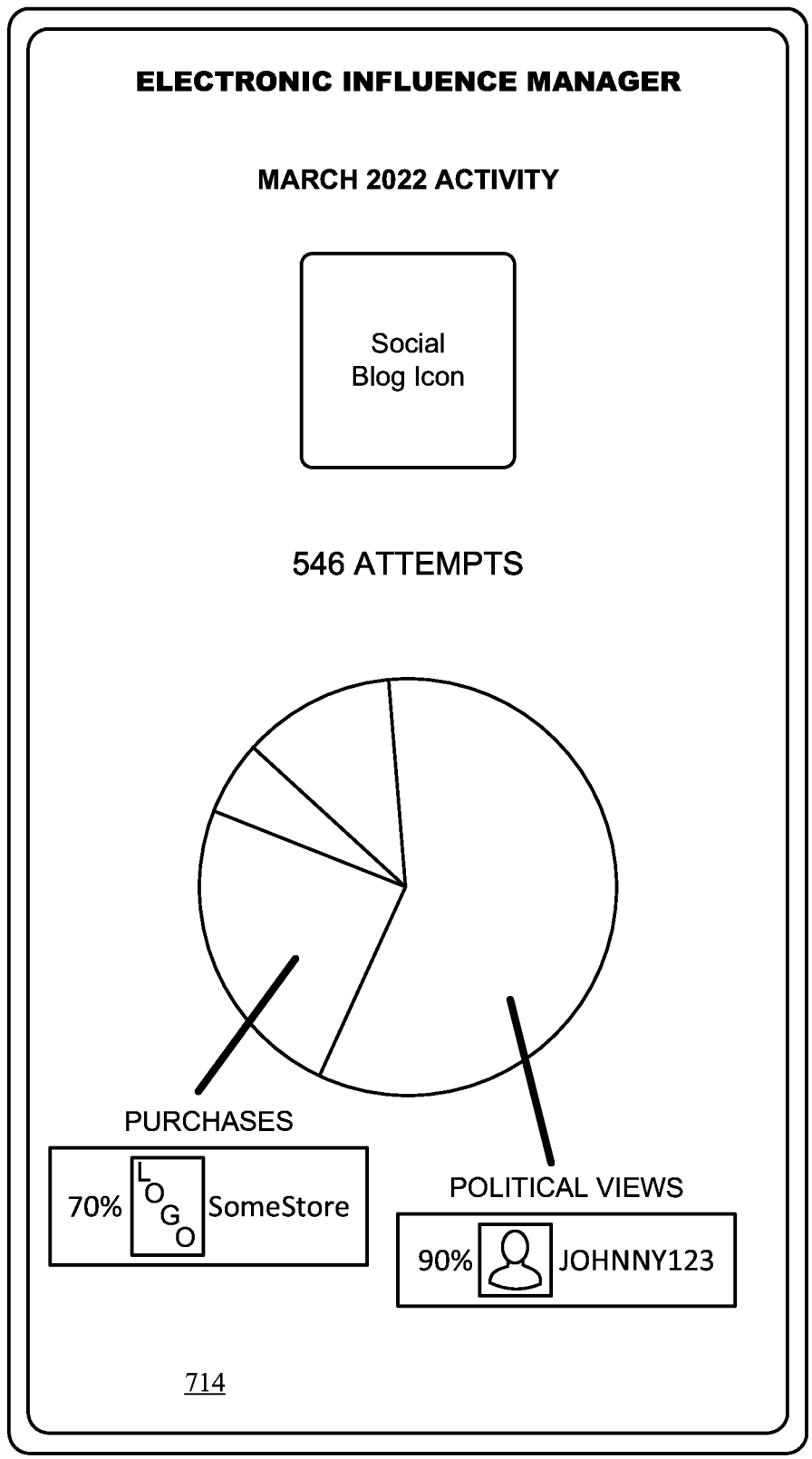
FIG. 7 is an example representation of an interface for reporting influence attempts aggregated over time, in accordance with various aspects and embodiments of the subject disclosure.

Another type of reporting, generally shown in the example interface 714 of FIG. 7, is directed to the reporting of aggregate influential attempts. For example, using data generated and collected over time by the electronic influence manager 108, the example interface 714 may present to the user a report of the electronic influence manager's (and possibly including the electronic influence manager server's) activity over a period of time (e.g., March 2022). These reports may be used by the user to gain insight into how often and how many influences are being attempted in communications to the user. As also shown in FIG. 7, the reporting of aggregate influential attempts also may permit the user to identify what types of influences being targeted to the user, and/or from where/whom most of the influential attempts are originating. Note that the user may be allowed to customize the appearance of such a report (as well as other interfaces).

Figure 8:
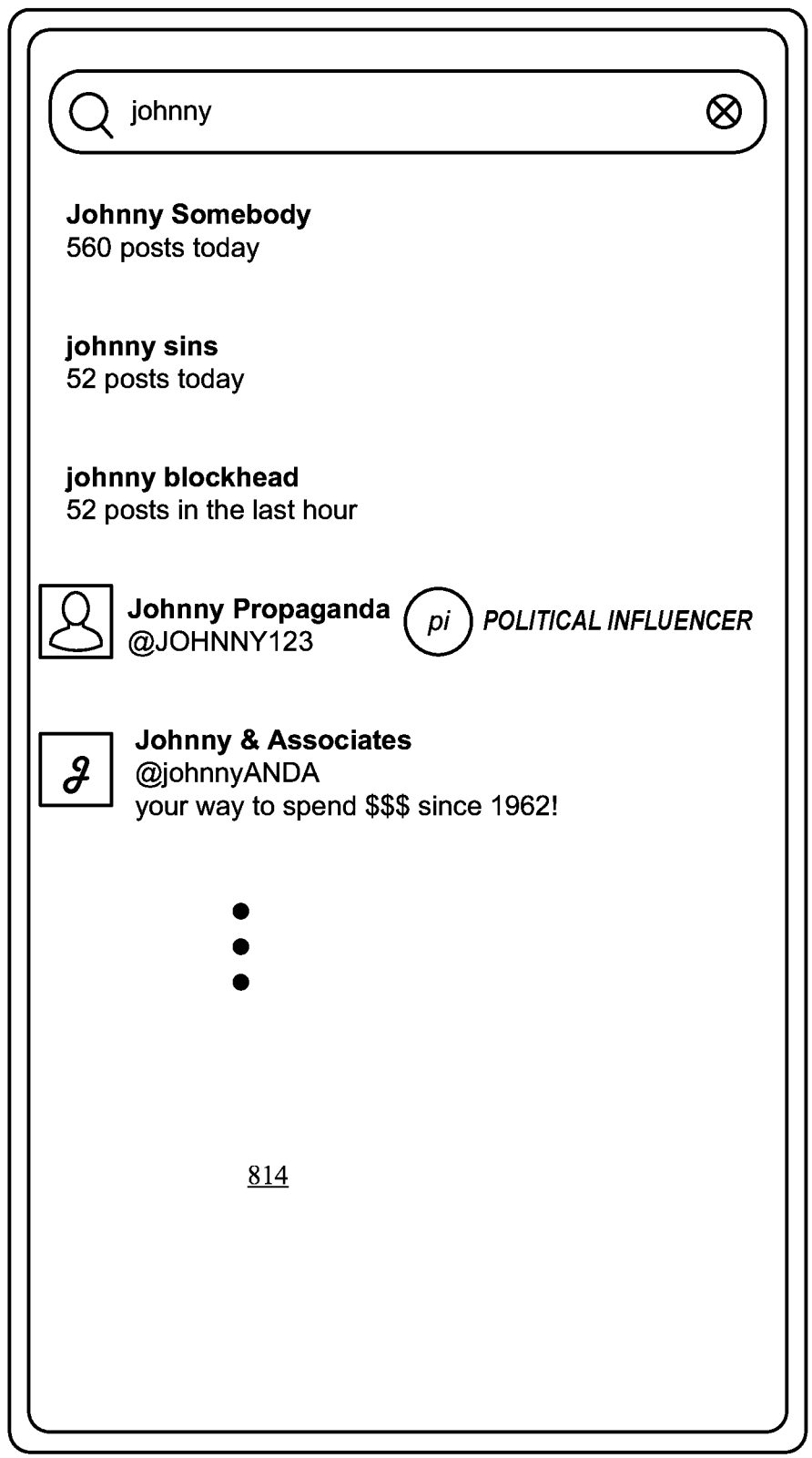
FIG. 8 is an example representation of an interface that provides search results including reputation information for an influencer, in accordance with various aspects and embodiments of the subject disclosure.

Furthermore, the electronic influence manager 108, in conjunction with the electronic influence manager server 110 or some other source (including the app servers themselves), may collect data across a number of users. This can identify influencers who affect more than one user and therefore may be identified as having a record or reputation for sending influence attempts. The electronic influence manager may share these data across influencers to the app servers 106(1)-106(n) themselves such that when other users are using that server's app instances, they may be presented with a historical representation or reputation for various users as influencers. In one example, an "Influencer badge" or other tag may be presented in association with electronic presence of influencers, such as when another user performs a search of users. This permits other users to identify influencers as such so as to help to determine how, and if, to connect with them; (note that a reputation can be positive or negative). An example is shown in FIG. 8, where a search of "johnny" returns a number of results on an example interface 814, including one that flags "Johnny Propaganda @JOHNNY123" as having a political influencer reputation.

Figure 9:
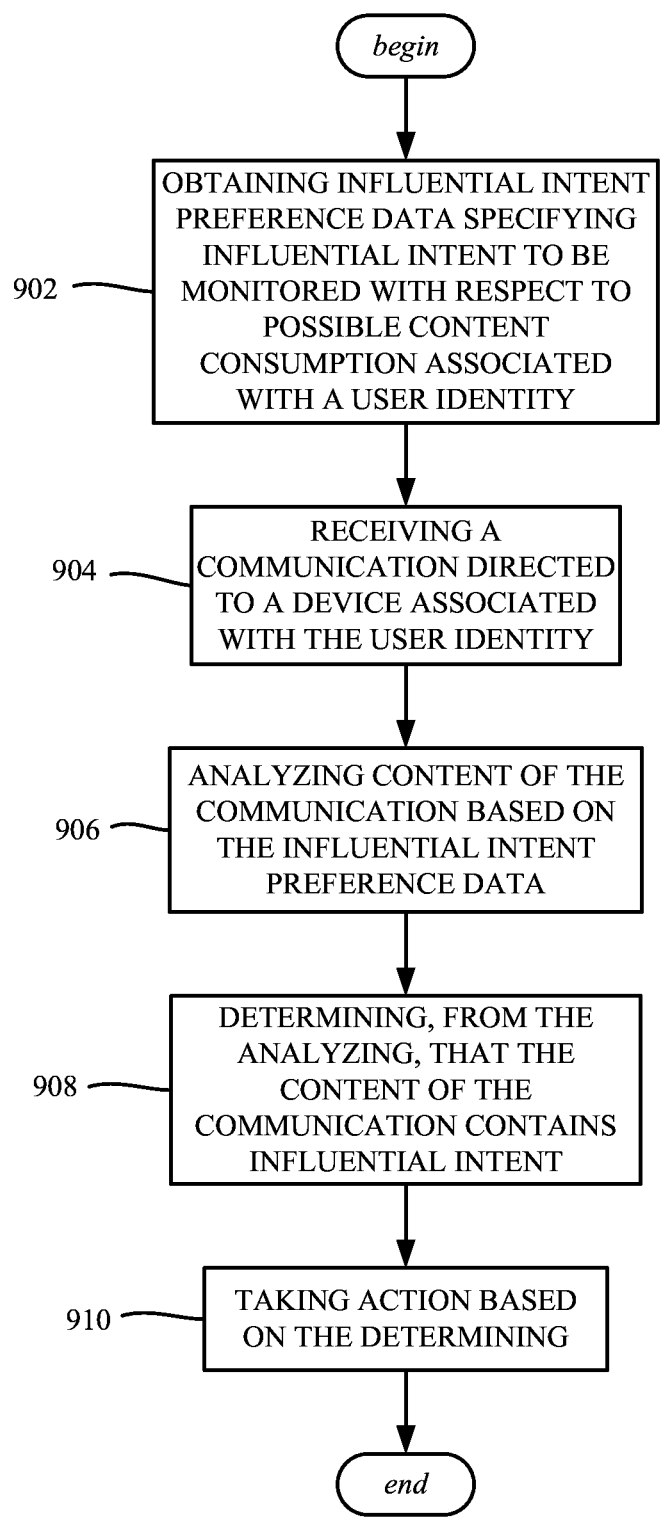
FIG. 9 is a flow diagram representing example operations related to outputting supplementary data describing monitored media content, in accordance with various aspects and embodiments of the subject disclosure.

One or more example aspects are represented in FIG. 9, and can correspond to a system, including a processor, and a memory that stores executable instructions that, when executed by the processor, facilitate performance of operations. Example operation 902 represents obtaining influential intent preference data specifying influential intent to be monitored with respect to possible content consumption associated with a user identity. Example operation 904 represents receiving a communication directed to a device associated with the user identity. Example operation 906 represents analyzing content of the communication based on the influential intent preference data. Example operation 908 represents determining, from the analyzing, that the content of the communication contains influential intent. Example operation 910 represents taking action based on the determining.

Analyzing the content can be performed by at least one of a content server, or a program on the device.

Taking the action can include blocking the communication from presentation on the device.

The content of the communication can be first content, and taking the action can include evaluating a count of times that the first content of the communication, plus second content of a related communication, have contained influential intent, and, in response to the count of times satisfying a threshold value, blocking the communication from presentation on the device. Note that counting can also be done by a cohort of population, e.g., how much do your friends or other groups do so relative to the current request. In one embodiment, the system can look at the typical dialogs of the groups with which a user is communicating and/or other "general" groups that exist on that social media channel. For example, a "general" channel may be discussing recent changes by a school board to reduce the number of holidays for students. If a user's social cohort is also talking about this change and sending messages with strong intent, the system may discount or temporarily ignore alerts generated from these conversations because the dialog is in line with general discussions. Similarly, "anomaly" discussions about the length of a school day or financial incentives may be detected as an influence-seeking comment.

Taking the action can include operating to present an alert via the user interface that the content of the communication contains influential intent.

The content of the communication can be first content, and taking the action can include evaluating a count of times that the first content of the communication, plus second content of a related communication, have contained influential intent, and, in response to the count of times satisfying a threshold value, operating to present an alert via the user interface that the first content of the communication contains influential intent.

The content of the communication can be first content, and taking the action can include rendering a first visible representation of the first content of the communication, in which the first visible presentation is modified relative to a second visible representation of second content that does not contain influential intent, to indicate that the first content contains influential intent.

Further operations can include obtaining type preference data specifying a type of communications to be monitored. The type preference data can include at least one of commercial influence, political influence, social sharing influence, educational learning influence, emotional state influence, or charitable giving influence. The content of the communication can be first content, and taking the action can include rendering a first visible representation of the first content of the communication, in which the first visible representation is modified relative to a second visible presentation of second content that does not contain influential intent, to indicate that the first content contains influential intent and matches the type preference data. The type preference data can be first type preference data, the communication can be a first communication, taking the action can include obtaining a collection of influential content information, the influential content information comprising the first type preference data and second type preference data of a second communication, and further operations can include outputting collection report data representing the collection of influential content information. If the system is analyzing by the type of influence/influencers, then it is possible to be already counting correctly, whereby the system can determine whether the discourse is unusual or not. In one embodiment, the system may discount the intent or magnitude of the intent if communications of peers in that group are typically generating this type of conversation. In one example, consider a user who communicates with a work cohort who is talking about different marketing campaigns with high-level officers of other companies. If this is true, the system can detect that this intent-based communication is common and can down-weight any possible alerting from a member of that community (e.g. other sales associates, executives, or brand-based messaging).

Taking the action can include collecting data corresponding to an influencer identity as a source of the communication.

Taking the action can include presenting the content, and further operations can include at least one of: collecting information associated with the user identity for use in subsequent analyzing of the content, or detecting interaction with the content, and outputting report data comprising information representing the detecting of the interaction.

Figure 10:
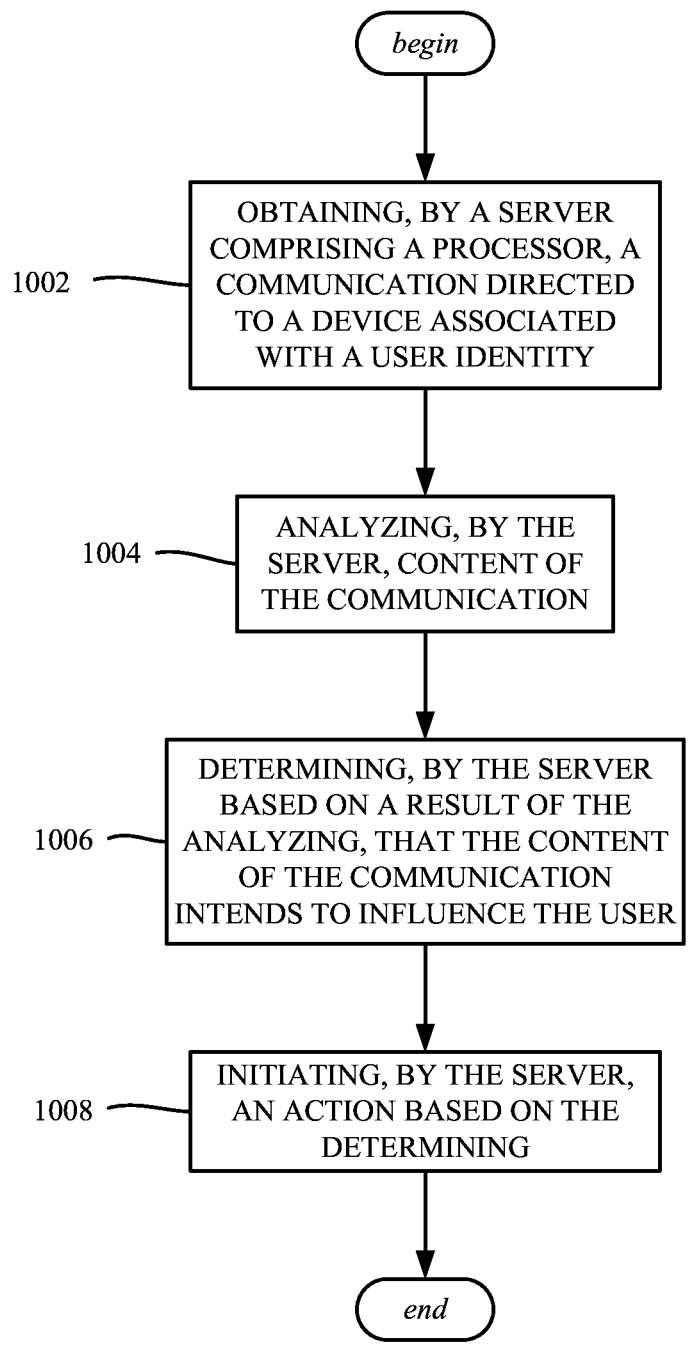
FIG. 10 is a flow diagram representing example operations related to outputting supplementary data describing monitored media content, in accordance with various aspects and embodiments of the subject disclosure.

One or more example aspects are represented in FIG. 10, and, for example, can correspond to operations, such as of a method. Example operation 1002 represents obtaining, by a server comprising a processor, a communication directed to a device associated with a user identity. Example operation 1004 represents analyzing, by the server, content of the communication. Example operation 1006 represents determining, by the server based on a result of the analyzing, that the content of the communication intends to influence the user. Example operation 1008 represents initiating, by the server, an action based on the determining.

Initiating the action can include at least one of: initiating blocking the content from delivery to the user device, or initiating notifying the user that the content of the communication intends to influence the user.

Figure 11:
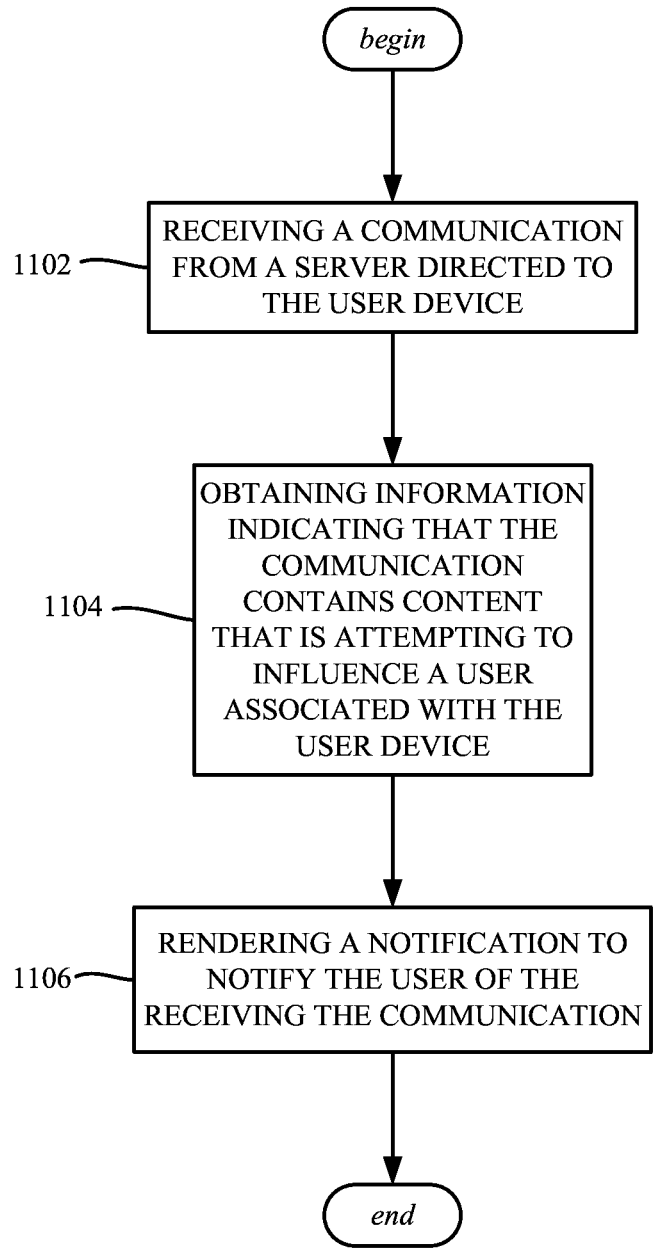
FIG. 11 is a flow diagram representing example operations related to presenting primary media content and outputting supplementary data describing monitored media content, in accordance with various aspects and embodiments of the subject disclosure.

One or more aspects are represented in FIG. 11, such as implemented in a machine-readable medium, including executable instructions that, when executed by a processor of a user device, facilitate performance of operations. Example operation 1102 represents receiving a communication from a server directed to the user device. Example operation 1104 represents obtaining information indicating that the communication contains content that is attempting to influence a user associated with the user device. Example operation 1106 represents rendering a notification to notify the user of the receiving the communication.

Obtaining the information indicating that the communication contains content that is attempting to influence the user can include analyzing the content the content of the communication with respect to at least one of: user preference data influential intent preference data or content type preference data.

Further operations can include blocking the communication from presentation on the user device; rendering the notification to notify the user of the receiving the communication can include rendering the notification to notify the user of the blocking.

Further operations can include presenting the content of the communication on the user device; rendering the notification to notify the user of the receiving the communication can include presenting the content with an indication that that the communication contains the content that is attempting to influence the user.

As can be seen, the technology described herein facilitates user control over whether electronic communications influence a user's subsequent behaviors. The technology described herein provides users of electronic devices with a convenient way to detect and manage communications directed to them which are intended to affect an influential behavior upon the users. The technology described herein provides a straightforward way to visualize such influential attempts, and thereby manage and/or remediate them. Blocking of such communications prior to downloading and/or after downloading is also facilitated.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (including both open-loop and closed-loop), beamforming, and codebook-based precoding can also be used to address issues such as efficiency, interference, and range.

Figure 12:
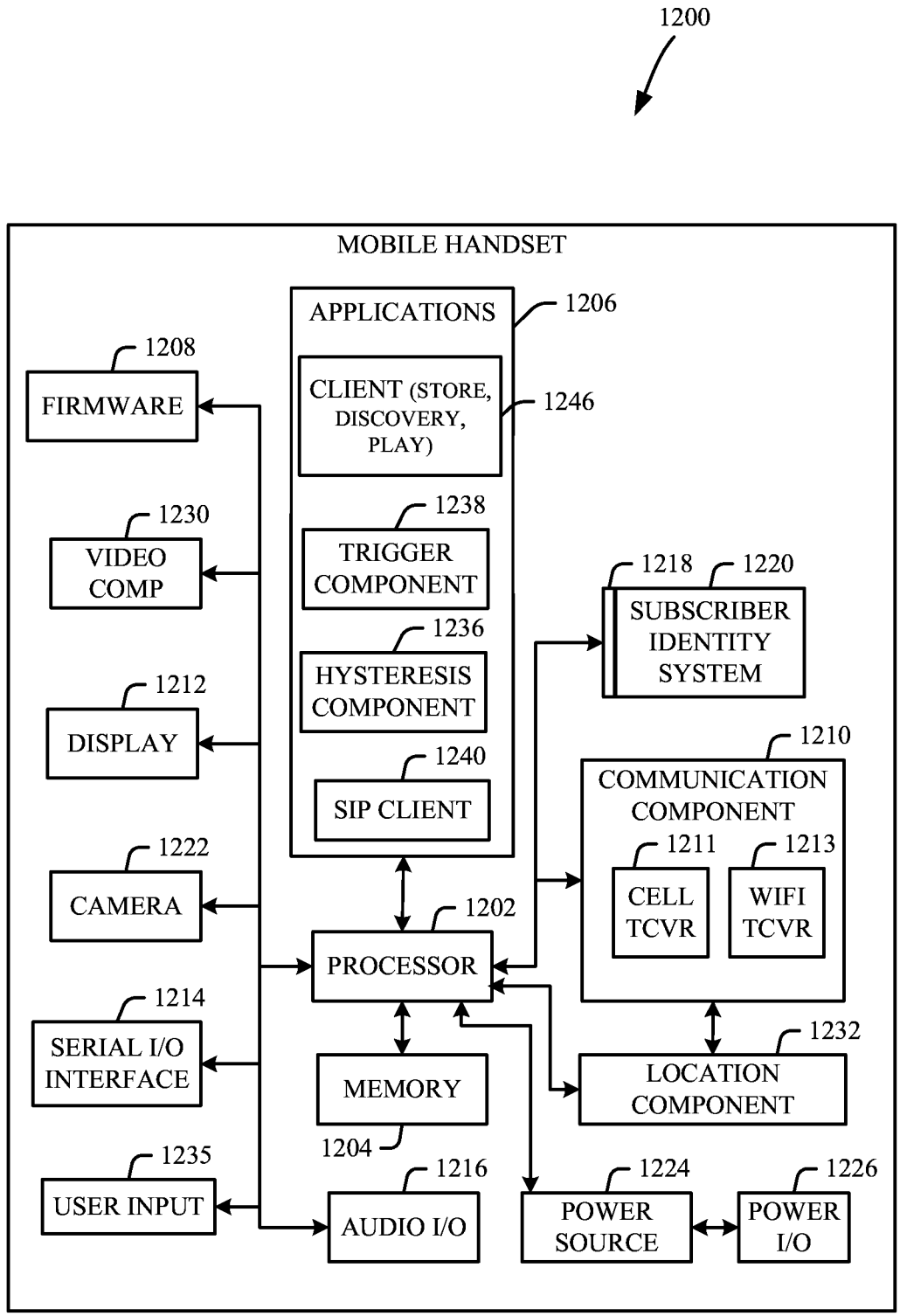
FIG. 12 illustrates an example block diagram of an example mobile handset operable to engage in a system architecture that facilitates wireless communications according to one or more embodiments described herein.

Referring now to FIG. 12, illustrated is a schematic block diagram of an example end-user device (such as user equipment) that can be a mobile device 1200 capable of connecting to a network in accordance with some embodiments described herein. Although a mobile handset 1200 is illustrated herein, it will be understood that other devices can be a mobile device, and that the mobile handset 1200 is merely illustrated to provide context for the embodiments of the various embodiments described herein. The following discussion is intended to provide a brief, general description of an example of a suitable environment 1200 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1200 includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE-1394) through a hardwire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communication component 1210 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1222 (e.g., a camera) can be provided for decoding encoded multimedia content. The video processing component 1222 can aid in facilitating the generation, editing and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1238 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 810, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
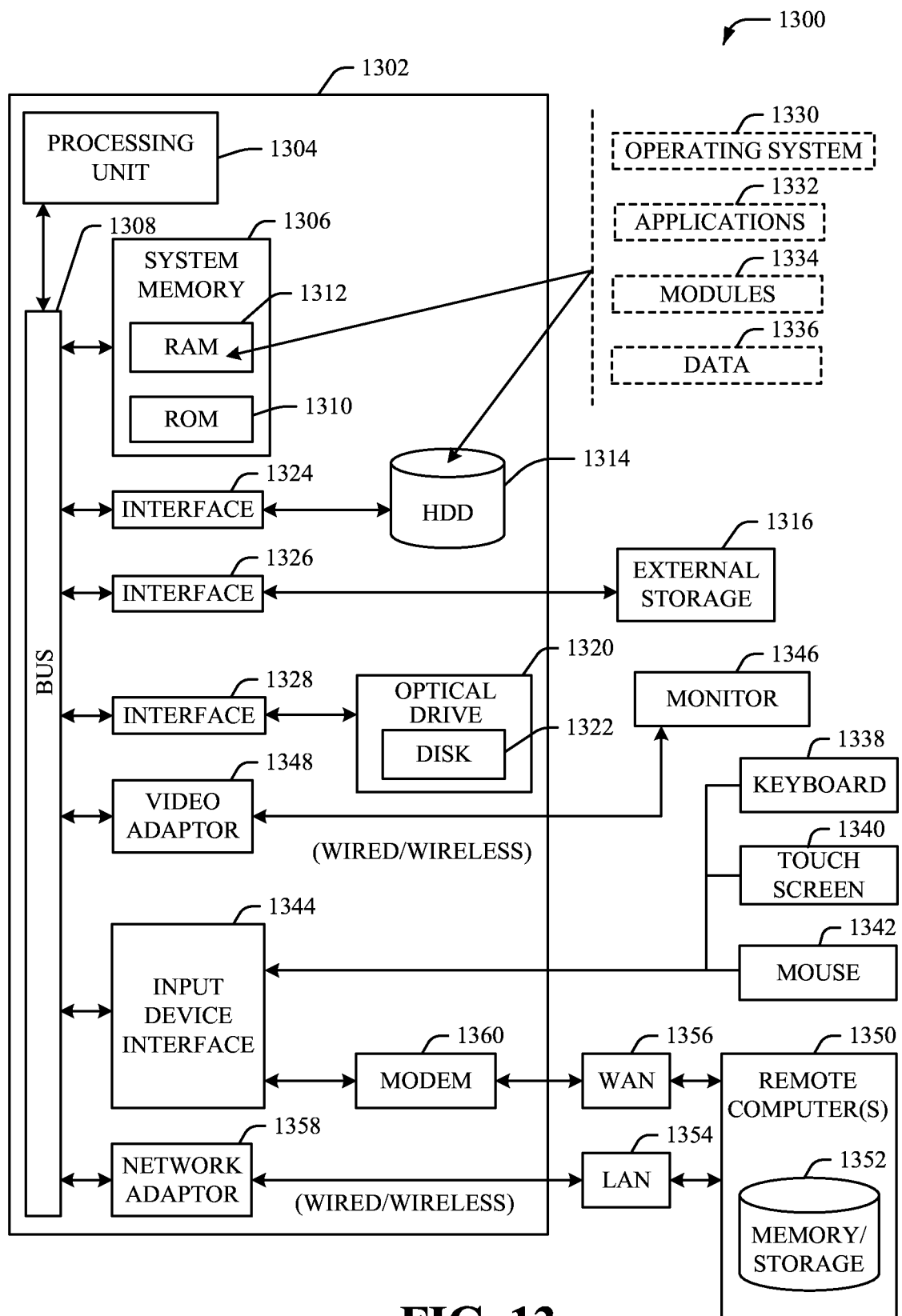
FIG. 13 illustrates an example block diagram of an example computer/machine system operable to engage in a system architecture that facilitates wireless communications according to one or more embodiments described herein.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD), non-volatile memory and other storage technology could be used in addition to, or in place of, an HDD 1314, and can be internal or external. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE-1394) interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally include emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can include one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE-1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/ storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 13 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:
1. A system, comprising:
a processor; and
a memory that stores executable instructions that, when executed by the processor of the system, facilitate performance of operations, the operations comprising:
obtaining influential intent preference data specifying unwanted influential intent and types of the unwanted influential intent to be monitored with respect to communications directed to a user identity;

receiving a communication directed to a device associated with the user identity resulting in a received communication;

analyzing the received communication based on the influential intent preference data;

determining, from the analyzing, that the received communication contains the specified unwanted influential intent;

determining, from the analyzing, whether the received communication is associated with a first community that is permitted to communicate the specified unwanted influential intent; and responsive to determining that the received communication contains the specified unwanted influential intent and is not associated with the first community:

taking an action based on the determining that the received communication contains the specified unwanted influential intent, wherein the taking the action further comprises presenting an alert overlaid with currently available media content, a set of currently available communications or both, wherein the alert indicates that the received communication contains the specified unwanted influential intent, and wherein the received communication containing the specified unwanted influential intent is displayed with the alert without a modification or being replaced by another content; and presenting information indicative of aggregate attempts of the specified unwanted influential intent, categorized by different types of the specified unwanted influential intent.

2. The system of claim 1, wherein the operations further comprise decreasing a value of the specified unwanted influential intent responsive to determining that the received communication contains the specified unwanted influential intent and is associated with the first community.

3. The system of claim 1, wherein the taking the action further comprises foregoing to replace the received communication determined to contain the specified unwanted influential intent by another content for presentation on the device.

4. The system of claim 1, wherein the operations further comprise evaluating a count of times that the received communication having the specified unwanted influential intent occurs, and, in response to the count of times satisfying a threshold value, blocking the received communication from presentation on the device without being modified or replaced by another content.

5. The system of claim 1, wherein the presenting the alert further comprises presenting the alert via a user interface that flags a type of the specified unwanted influential intent.

6. The system of claim 1, wherein the operations further comprises evaluating a count of times that the received communication having the specified unwanted influential intent occurs, and, in response to the count of times satisfying a threshold value, operating to present the alert via a user interface that the received communication contains the unwanted influential intent specified in the influential intent preference data.

7. The system of claim 1, wherein the received communication is first communication, and wherein the taking the action comprises rendering a first visible representation of the first communication, in which the first visible representation is modified relative to a second visible representation of second communication that does not contain the specified unwanted influential intent, to indicate that the first communication contains the specified unwanted influential intent.

8. The system of claim 1, wherein the obtaining the types of the unwanted influential intent further comprises obtaining type preference data specifying a type of communications to be monitored.

9. The system of claim 8, wherein the type preference data comprises at least one of commercial influence, political influence, social sharing influence, educational learning influence, emotional state influence, or charitable giving influence.

10. The system of claim 8, wherein the received communication is first communication, and wherein the taking the action comprises rendering a first visible representation of the first communication, in which the first visible representation is modified relative to a second visible presentation of second content that does not contain the specified unwanted influential intent, to indicate that the first communication contains the specified unwanted influential intent and matches the type preference data.

11. The system of claim 8, wherein the operations further comprise obtaining a collection of unwanted influential content information, and outputting collection report data representing the collection of the unwanted influential content information.

12. The system of claim 1, wherein the taking the action comprises collecting data corresponding to an influencer identity as a source of the received communication.

13. The system of claim 1, wherein the operations further comprise at least one of:
collecting information associated with the user identity for use in subsequent analyzing of the received communication; or
detecting interaction with the received communication, and outputting report data comprising information representing the detecting of the interaction.

14. The system of claim 1, wherein taking the action further comprises outputting a representation of the received communication via the device, and outputting a feedback interface via the device for obtaining user input related to the received communication.

15. A method, comprising:
obtaining, by a server comprising a processor, influential intent preference data specifying types of unwanted influential intent to be monitored with a set of communications directed to a user identity;
receiving, by the server, a communication directed to a device associated with the user identity, resulting in a received communication;
analyzing, by the server, the received communication based on the influential intent preference data;
determining, by the server based on a result of the analyzing, that the received communication corresponds to one of the specified types of the unwanted influential intent;
determining, by the server based the result of the analyzing, whether the received communication is associated with a first community that is permitted to communicate the unwanted influential intent; and
responsive to the determining that the received communication corresponds to one of the specified types of the unwanted influential intent and is not associated with the first community:
initiating, by the server, an action based on the determining that the received communication corresponds to one of the specified types of the unwanted influential intent, wherein the initiating the action further comprises presenting an alert overlaid with currently available media content, a currently available set of communications or both, wherein the alert indicates that the received communication contains the one of the specified types of the unwanted influential intent, and wherein the received communication corresponding to one of the specified types of the unwanted influential intent is displayed with the alert without a modification or being replaced by another content; and presenting, by the server, information indicative of aggregate attempts of the specified types of the unwanted influential intent.

16. The method of claim 15, wherein initiating the action further comprises foregoing to replace the received communication with another content for presentation on a display device.

17. A non-transitory machine-readable medium, comprising executable instructions that, when executed by a processor of a user device, facilitate performance of operations, the operations comprising:

receiving a communication from a server directed to the user device, resulting in a received communication;

obtaining information indicating that the received communication is attempting to influence a user associated with the user device;

analyzing the received communication based on influential intent preference data specifying types of unwanted influential intent to be monitored with a set of communications directed to a user identity;

determining, from the analyzing, that the received communication corresponds to one of the specified types of the unwanted influential intent;

determining, from the analyzing, whether the received communication is associated with a first community that is permitted to communicate the unwanted influential intent; and responsive to the determining that the received communication corresponds to one of the specified types of the unwanted influential intent and is not associated with the first community:

taking an action based on the determining that the received communication corresponds to one of the specified types of the unwanted influential intent, wherein the taking the action further comprises presenting an alert overlaid with currently available media content, a currently available set of communications or both, wherein the alert indicates that the received communication contains the one of the specified types of the unwanted influential intent, and wherein the received communication corresponding to the one of the specified types of the unwanted influential intent is displayed with the alert without a modification or being replaced by another content; and presenting information indicative of aggregate attempts of the specified types of the unwanted influential intent.

18. The non-transitory machine-readable medium of claim 17, wherein the analyzing the received communication further comprises analyzing the received communication with respect to at least one of: user preference data influential intent preference data or content type preference data.

19. The non-transitory machine-readable medium of claim 17, wherein the taking the action further comprises foregoing to replace the received communication by another content for presentation on the user device.

20. The non-transitory machine-readable medium of claim 17, wherein the taking the action comprises collecting data corresponding to an influencer identity as a source of the received communication.

* * * * *